(12) United States Patent
Johnston et al.

(10) Patent No.: US 8,487,518 B2
(45) Date of Patent: Jul. 16, 2013

(54) SOLID STATE LIGHT WITH OPTICAL GUIDE AND INTEGRATED THERMAL GUIDE

(75) Inventors: Raymond P. Johnston, Lake Elmo, MN (US); Michael A. Meis, Stillwater,, MN (US); Robert L. Brott, Woodbury, MN (US); Martin Kristoffersen, Maplewood, MN (US); Charles N. DeVore, Hugo, MN (US); Paul E. Humpal, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 261 days.

(21) Appl. No.: 12/960,642

(22) Filed: Dec. 6, 2010

(65) Prior Publication Data

US 2012/0139403 A1 Jun. 7, 2012

(51) Int. Cl.
*H01J 1/02* (2006.01)
*H01J 7/24* (2006.01)
*H01J 61/52* (2006.01)
*H01K 1/58* (2006.01)

(52) U.S. Cl.
USPC ............... 313/46; 313/11; 313/45; 362/326; 362/558; 362/294; 362/580

(58) Field of Classification Search
USPC ............... 362/317, 326, 268, 551, 555, 558, 362/249, 580, 547, 218, 345; 313/11, 45–46; D26/138
See application file for complete search history.

(56) References Cited

U.S. PATENT DOCUMENTS

| 4,630,177 | A | * | 12/1986 | Von Kohorn et al. ......... 362/551 |
| 5,387,458 | A | | 2/1995 | Pavelka et al. |
| 6,297,906 | B1 | | 10/2001 | Allen et al. |
| 6,350,041 | B1 | | 2/2002 | Tarsa et al. |
| 6,523,978 | B1 | | 2/2003 | Huang |
| 6,802,363 | B1 | | 10/2004 | Wang |
| 6,974,234 | B2 | * | 12/2005 | Galli ........................... 362/294 |
| 7,144,135 | B2 | | 12/2006 | Martin et al. |

(Continued)

FOREIGN PATENT DOCUMENTS

| AU | 2005100101 | 3/2005 |
| CN | 200968565 | 10/2007 |

(Continued)

OTHER PUBLICATIONS

U.S. Appl. No. 12/829,611, filed Jul. 2, 2010, "Transistor Ladder Network for Driving a Light Emitting Diode Series String".

(Continued)

*Primary Examiner* — Anne Hines
*Assistant Examiner* — Jose M Diaz

(57) ABSTRACT

A solid state light having a solid state light source such as LEDs, an optical guide, and a thermal guide. The optical guide is coupled to the light source for receiving and distributing light from the light source, and the thermal guide is integrated with the optical guide for providing thermal conduction from the solid state light source and dissipating heat through convection and radiation for cooling the light. The optical guide can be tapered to enhance the efficiency of light distribution. The thermal guide can have an external shell connected with internal fins, and the external shell can have a reflective coating to provide for a back reflector behind the optical guide.

31 Claims, 17 Drawing Sheets

U.S. PATENT DOCUMENTS

| | | | |
|---|---|---|---|
| 7,160,012 B2 * | 1/2007 | Hilscher et al. | 362/555 |
| 7,270,458 B2 | 9/2007 | Kuo et al. | |
| 7,270,460 B2 | 9/2007 | Merz et al. | |
| 7,347,584 B2 | 3/2008 | Sun et al. | |
| 7,588,359 B2 * | 9/2009 | Coushaine et al. | 362/555 |
| 7,600,882 B1 * | 10/2009 | Morejon et al. | 362/84 |
| 7,744,250 B2 * | 6/2010 | Lee et al. | 362/294 |
| D627,085 S | 11/2010 | Duan et al. | |
| D627,491 S | 11/2010 | Wang et al. | |
| 7,863,831 B2 | 1/2011 | Vos | |
| D642,704 S | 8/2011 | Hagens et al. | |
| D655,860 S * | 3/2012 | Choi et al. | D26/138 |
| 8,256,918 B2 * | 9/2012 | Chaves et al. | 362/216 |
| 2004/0101990 A1 | 5/2004 | Dunn et al. | |
| 2004/0201990 A1 | 10/2004 | Meyer | |
| 2005/0117332 A1 | 6/2005 | Maack | |
| 2005/0195600 A1 | 9/2005 | Porchia et al. | |
| 2005/0200262 A1 | 9/2005 | Wu | |
| 2005/0201100 A1 * | 9/2005 | Cassarly et al. | 362/317 |
| 2006/0274529 A1 | 12/2006 | Cao | |
| 2006/0285325 A1 | 12/2006 | Ducharme et al. | |
| 2006/0291249 A1 * | 12/2006 | Tessnow | 362/615 |
| 2007/0070645 A1 * | 3/2007 | Coushaine et al. | 362/555 |
| 2007/0195527 A1 * | 8/2007 | Russell | 362/240 |
| 2007/0263393 A1 | 11/2007 | Van De Ven | |
| 2007/0279862 A1 * | 12/2007 | Li | 361/692 |
| 2008/0013316 A1 | 1/2008 | Chiang | |
| 2008/0049399 A1 | 2/2008 | Lu et al. | |
| 2008/0084692 A1 | 4/2008 | DeRose | |
| 2008/0084700 A1 | 4/2008 | Van De Ven | |
| 2008/0170392 A1 * | 7/2008 | Speier et al. | 362/227 |
| 2008/0186704 A1 | 8/2008 | Chou et al. | |
| 2008/0210953 A1 | 9/2008 | Ladstatter et al. | |
| 2009/0034250 A1 | 2/2009 | Chen | |
| 2009/0059559 A1 * | 3/2009 | Pabst et al. | 362/84 |
| 2010/0097823 A1 | 4/2010 | Chang et al. | |
| 2010/0109499 A1 * | 5/2010 | Vilgiate et al. | 313/1 |
| 2010/0148652 A1 | 6/2010 | Vetrovec | |
| 2010/0181888 A1 | 7/2010 | Lu | |
| 2010/0194277 A1 * | 8/2010 | Yoo | 315/86 |
| 2010/0246166 A1 | 9/2010 | Hsu et al. | |
| 2010/0264800 A1 | 10/2010 | Liu et al. | |
| 2010/0314985 A1 * | 12/2010 | Premysler | 313/46 |
| 2010/0320904 A1 * | 12/2010 | Meir | 315/32 |
| 2011/0080096 A1 * | 4/2011 | Dudik et al. | 315/112 |
| 2011/0089830 A1 * | 4/2011 | Pickard et al. | 315/32 |
| 2011/0090686 A1 * | 4/2011 | Pickard | 362/235 |
| 2011/0101861 A1 * | 5/2011 | Yoo | 315/35 |
| 2011/0234076 A1 * | 9/2011 | Simon et al. | 313/46 |
| 2011/0291560 A1 | 12/2011 | Wang et al. | |
| 2011/0292660 A1 | 12/2011 | Eichelberger | |
| 2011/0309735 A1 * | 12/2011 | Parker et al. | 313/46 |
| 2012/0025687 A1 * | 2/2012 | Wen | 313/46 |
| 2012/0044692 A1 | 2/2012 | Liang et al. | |
| 2012/0112615 A1 * | 5/2012 | Kuenzler | 313/46 |

FOREIGN PATENT DOCUMENTS

| | | |
|---|---|---|
| CN | 201003702 | 1/2008 |
| CN | 201081146 | 7/2008 |
| CN | 10-1852356 | 10/2010 |
| DE | 20 2004 012513 | 12/2004 |
| DE | 20 2007 009 272 | 12/2007 |
| GB | 2 345 954 | 7/2000 |
| JP | 2007-265892 | 10/2007 |
| JP | 2008-091140 | 4/2008 |
| TW | 119782 | 3/1995 |
| TW | 134004 | 9/1997 |
| TW | 137672 | 11/2010 |
| WO | WO 2006/006473 | 1/2006 |
| WO | WO 2007/130359 | 11/2007 |
| WO | WO 2010/058325 | 5/2010 |
| WO | WO 2010/146746 | 10/2010 |
| WO | WO 2010114244 A2 * | 10/2010 |
| WO | WO 2012/027421 | 3/2012 |

OTHER PUBLICATIONS

U.S. Appl. No. 29/380,445, filed Dec. 6, 2010, "Design Application for a Solid State Light Assembly".

U.S. Appl. No. 12/535,203, filed Aug. 4, 2009, "Solid State Light With Optical Guide and Integrated Thermal Guide".

* cited by examiner

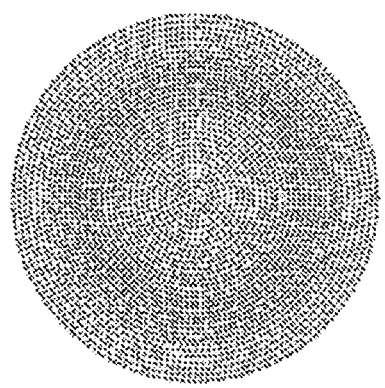 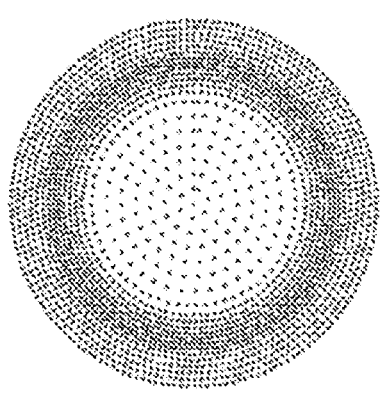
*Fig. 25*                *Fig. 26*

US 8,487,518 B2

SOLID STATE LIGHT WITH OPTICAL GUIDE AND INTEGRATED THERMAL GUIDE

BACKGROUND

The energy efficiency of lighting has become an important consideration in industrial, consumer, and architectural lighting applications. With the advances in solid state light technology, light emitting diodes (LEDs) have become more energy efficient than fluorescent lights. Further, the marketplace has a large established fixture base for Edison, fluorescent and high intensity discharge lights. These types of applications present a significant technical challenge for LEDs due to their inherent point source nature, and the need to operate the LEDs at relatively low temperatures. Today there are many solutions addressing these issues, including fans, thermal sinks, heat pipes and the like. However, these approaches limit the applications by adding complexity, cost, efficiency loss, added failure modes, and an undesirable form factor. The need remains to find a solution that can provide optical and electrical efficiency benefits, at attractive manufacturing costs and design.

SUMMARY

A light, consistent with the present invention, includes a light source, an optical guide, and a thermal guide. The optical guide is coupled to the light source for receiving and distributing light from the light source, and the thermal guide is integrated with the optical guide for providing thermal conduction from the light source for cooling the light.

In one embodiment, the optical guide is tapered to enhance the efficiency of light distribution. In another embodiment, the thermal guide has an external shell connected with internal fins, and the external shell can have a reflective coating to provide for a back reflector behind the optical guide.

BRIEF DESCRIPTION OF THE DRAWINGS

The accompanying drawings are incorporated in and constitute a part of this specification and, together with the description, explain the advantages and principles of the invention. In the drawings.

FIG. 25 is a first extraction pattern for the optical guide; and

FIG. 26 is a second extraction pattern for the optical guide.

DETAILED DESCRIPTION

Figure 1:
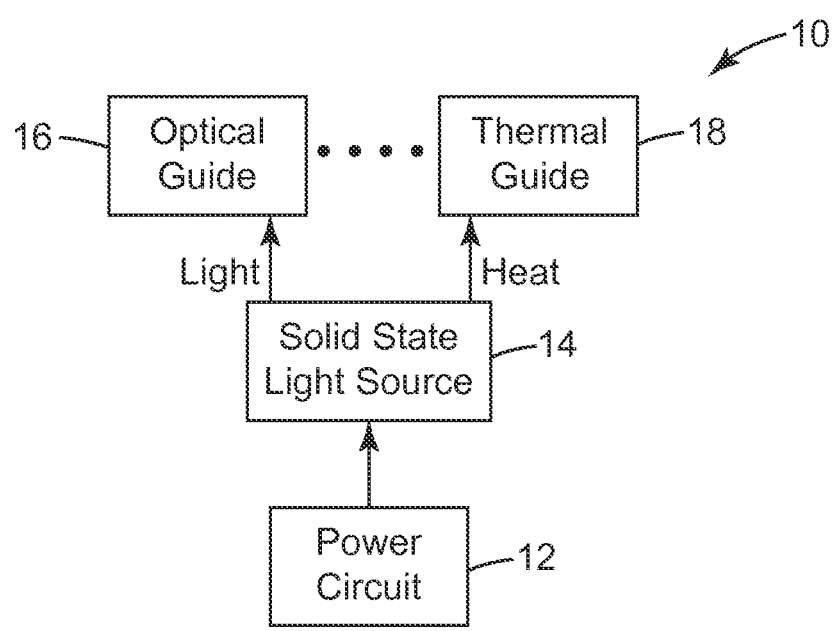
FIG. 1 is a diagram illustrating a solid state light source with an optical guide and integrated thermal guide.

FIG. 1 is a diagram illustrating components of a light 10 having a power circuit 12, a solid state light source 14, and a thermo-optical guide comprising an optical guide 16 and an integrated thermal guide 18. Power circuit 12 receives power from a power supply and provides the required voltage and current to drive solid state light source 14, which is in optical communication with optical guide 16. Power circuit 12 is an optional element of light 10, if the power supply is configured to provide the required voltage and current directly to light 10 or if the circuit is external to light 10. Solid state light source 14 injects light into optical guide 16, which receives and distributes the light. Optical guide 16 includes light injection, light transport, and light extraction zones or elements in order to distribute the light. Thermal guide 18 is integrated with optical guide 16 in order to draw heat from solid state light source 14 through conduction and dissipate the heat through convection or radiation, or both, to cool light 10 and to efficiently utilize both area and volume for the cooling. Thermal guide 18 includes heat acquisition, heat spreading, and heat dissipation zones or elements in order to cool the light. Through integration of the optical and thermal guides, embodiments of this invention overcome many of the limitations of current solid state light concepts such as those identified above.

Solid state light source 14 can be implemented with, for example, LEDs, organic light emitting diodes (OLEDs), or other solid state light sources. Certain embodiments can provide for uniformly distributed light from the solid state light source. Alternatively, embodiments may be employed to control or direct light in a particular distribution. In one example, refraction can be used to control the emitted light; for example, lenses may be used to focus the light or reflectors may be used to concentrate or spread the light. For example, in certain embodiments the light can produce a cone or curtain of light. The lenses could have air permeability for cooling and can include Fresnel lenses, prismatic structures, or lenslet structures. In other embodiments, diffractive optics may be employed to control or direct both the spectrum and the distribution of the emitted light. For example, a diffractive lens may be used to direct a particular light distribution, or color from a broad light distribution, in a particular direction. Also, combinations of diffractive and refractive optics may be used.

The solid state light sources can emit light of various colors for decorative or other lighting effects. Solid state light source 14 is electrically connected with power circuit 12, which can include a flexible circuit or other circuitry for powering the solid state light source. The circuitry to power the light source can include dimming circuitry and electronics to control frequency shifting or color shifting components that help produce a more desirable light, and an example of such electronics are described in U.S. Patent Application Publication No. 2009/0309505, which is incorporated herein by reference as if fully set forth.

Optical guide 16 can be implemented with, for example, a transparent or translucent material capable of receiving light from the solid state light source and emitting the light. For example, optical guide 16 preferably is made of an optically suitable material such as polycarbonate, polyacrylates such as polymethyl methacrylate, polystyrene, glass, or any number of different plastic materials having sufficiently high refractive indexes for the optical guide to distribute light. The optical guide can be configured in a variety of shapes such as a bulb, sphere, cylinder, cube, sheet, or other shape. Furthermore, the optical guide can include a matrix material that can contain light frequency shifting material to obtain a more desirable color, and examples of matrix stabilized dyes are described in U.S. Pat. No. 5,387,458, which is incorporated herein by reference as if fully set forth.

Thermal guide 18 can be implemented with a material capable of conducting heat from the solid state light source and dissipating the heat. For example, the thermal guide is preferably comprised of a material with a thermal conductivity from about 1 W/(m-K) to 1000 W/(m-K), and more preferably from 10 W/(m-K) to 1000 W/(m-K), and most preferable from 100 W/(m-K) to 1000 W/(m-K). The thermal guide draws heat from the solid state light source through conduction and dissipates heat into air through convection or radiation, or both. Optionally, components of the thermal guide can include heat pipes and thermal siphons. Optionally, the thermal guide, or a portion thereof, can include a thermally conductive coating on the surfaces of the solid state light source; for example, carbon nanotubes that can transport heat from the solid state light source through conduction and convection may be coated onto the surfaces.

The thermal guide is integrated with the optical guide, meaning that the thermal guide is in sufficient contact, directly or indirectly, with the solid state light source in order to conduct and dissipate heat from the solid state light source for the light to function. For example, the thermal guide can draw heat from the solid state light sources to maintain the light sources cool enough to function as intended. The thermal guide can be directly in physical contact with the solid state light sources or indirectly in contact with them such as through a ring or other components upon which the solid state light sources are mounted. The thermal guide can also be in physical contact with the optical guide, either directly or indirectly through other components. Alternatively, the thermal guide need not be in physical contact with the optical guide, provided that the thermal guide can conduct sufficient heat from the solid state light sources in order for the light to function. Therefore, the thermal guide resides either co-extensively proximate to at least a portion or preferably a majority of the area of the optical guide, or the thermal guide resides within at least a portion or preferably a majority of the volume of the optical guide in the case of a bulb, sphere or other three dimensional shape having an interior volume.

The thermal guide can include thermal conductivity enhancements such as metal coatings or layers, or conductive particles, to help conduct the heat generated by the solid state light sources into and along the thermal guide. Further, the thermal guide can have convective thermal enhancements such as fins and microstructures to increase the convection and radiation heat transfer coefficient. The thermal guide can also have optical enhancements in order to enhance the light output of the optical guide. For example, the thermal guide can be formed from a reflective material or a material modified to have a reflective surface such as white paint, a polished surface, or a thin reflective material on its surface. The reflective surface can also be made from a material with high infrared emissivity in order to increase heat dissipation to the surroundings by thermal radiation.

An example of a solid state light is disclosed in U.S. patent application Ser. No. 12/535,203, entitled "Solid State Light with Optical Guide and Integrated Thermal Guide," and filed Aug. 4, 2009, which is incorporated herein by reference as if fully set forth. An example of a circuit for driving LEDs for a solid state light is disclosed in U.S. patent application Ser. No. 12/829,611, entitled "Transistor Ladder Network for Driving a Light Emitting Diode Series String," and filed Jul. 2, 2010, which is incorporated herein by reference as if fully set forth.

Optical Guide with Integrated Thermal Guide

Figure 2:
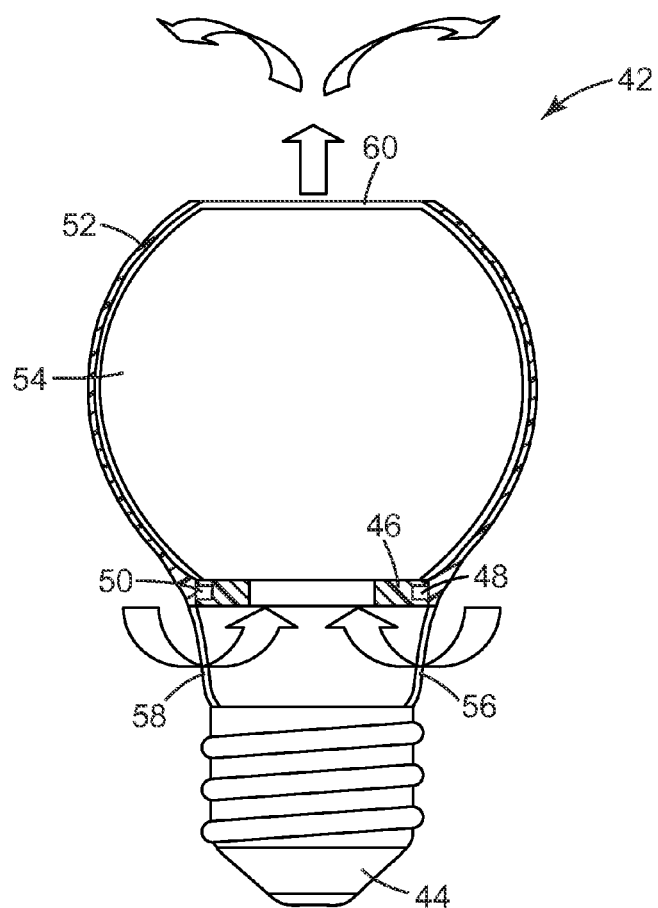
FIG. 2 is a cross sectional side view of a solid state light using an optical guide having an exterior portion for emitting light and an interior portion for cooling.
Figure 3:
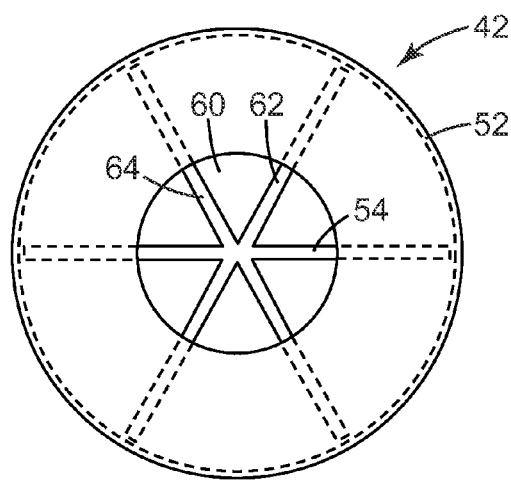
FIG. 3 is a top view of the light of FIG. 2.
Figure 4:
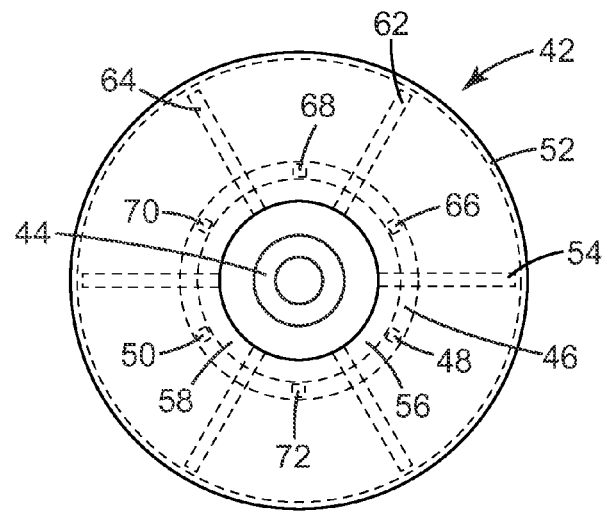
FIG. 4 is a bottom view of the light of FIG. 2.

FIG. 2 is a cross sectional side view of an embodiment of a solid state light 42 using an optical guide having an exterior portion for emitting light and an interior portion for cooling. FIGS. 3 and 4 are top and bottom views, respectively of light 42. Light 42 includes an optical guide 52, integrated thermal guide 54, and solid state light sources on an optional heat spreader ring 46. The heat spreader ring 46 can operate by thermal conduction or have a heat pipe or thermal siphon associated with it. The heat spreader ring contains elements that efficiently connect to the thermal guide, an example of which includes a ring containing bent fin elements that are thermally connected to the thermal guide. Alternatively, the solid state light sources can be coupled directly to a thermal guide without a heat spreader ring. For the solid state light sources, light 42 can include, for example, LEDs 48, 50, 66, 68, 70, and 72 arranged around ring 46, as shown in FIG. 4. The solid state light sources are in optical communication with optical guide 52; for example, the light sources can be located within hemispherical or other types of depressions in an edge of optical guide 52 and possibly secured through use of an optically clear adhesive.

A base 44 is configured to connect to a power supply, and it can include a power circuit for providing the required voltage and current from the power supply to drive the solid state light sources. Base 44 can be implemented with, for example, an Edison base for use with conventional light bulb sockets or a base for use with conventional fluorescent light fixture connections. Air passages 56 and 58 are provided between optical guide 52 and base 44 to provide free convection across thermal guide 54 through an air passage 60.

In this exemplary embodiment, the thermal guide is implemented with metallic fins 54, 62, and 64, as illustrated in FIG. 3. The fins are integrated with light guide 52, as shown in FIGS. 3 and 4, in order to draw heat from solid state light sources 48, 50, 66, 68, 70, 72 and dissipate the heat through convection or radiation, or both, by air flow in air passage 60. The thermal guide can optionally include a heat pipe or thermal siphon. Optical guide 52 can be implemented with, for example, polycarbonate, polyacrylates such as polymethyl methacrylate, polystyrene, glass, or any number of different plastic materials having sufficiently high refractive indexes for the optical guide to distribute light. The exterior portion of light 42 can be used to distribute and emit light from the solid state light sources, and the interior portion of light 42 is used for cooling the thermal guide and solid state light sources. Optical guide 52 can be formed in a bulb shape, as represented in FIG. 2, or in other shapes. With certain shapes, such as a bulb shape shown in FIG. 2, the interior portion of optical guide 52 can form an interior volume, and the thermal guide can be integrated with the interior volume of the optical guide for providing thermal conduction from the solid state light sources.

Figure 5:
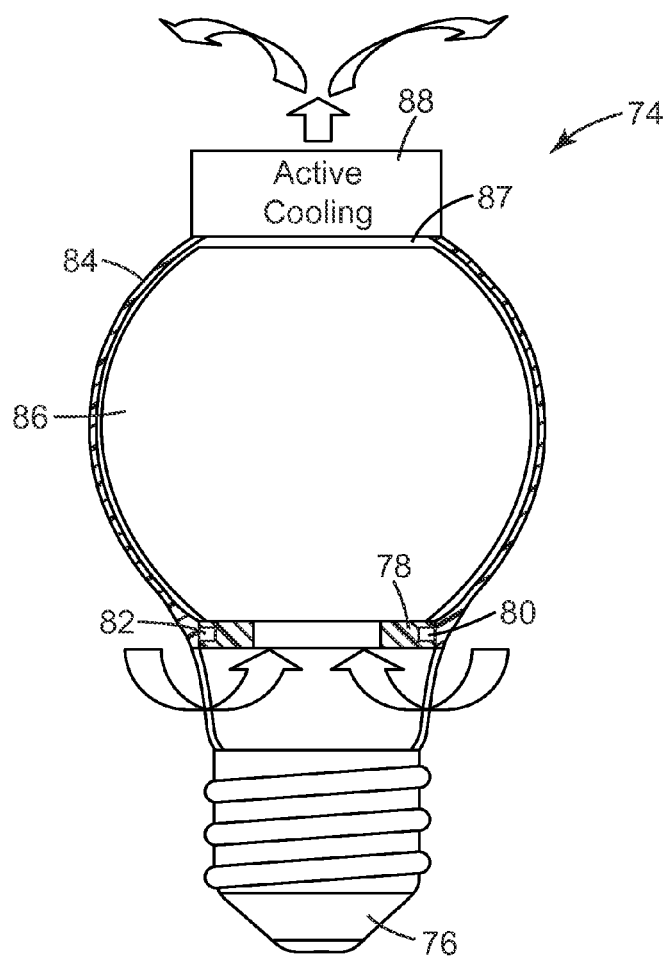
FIG. 5 is a cross sectional side view of a solid state light with an active cooling element.

FIG. 5 is a cross sectional side view of a solid state light 74 with an active cooling element 88. Light 74 can have a similar construction as light 42. Light 74 includes a base 76, an optical guide 84, a thermal guide 86, and solid state light sources, such as LEDs 80 and 82, arranged on an optional heat spreader ring 78. Active cooling element 88, such as a fan, draws air through air passage 87 for cooling in addition to free convection and radiation. Active cooling element 88 can be coupled to a power source through base 76, and it can run continuously when light 74 is in operation or can include a temperature sensor to active it only when light 74 is above a certain temperature.

Tapered Optical Guide

Figure 6:
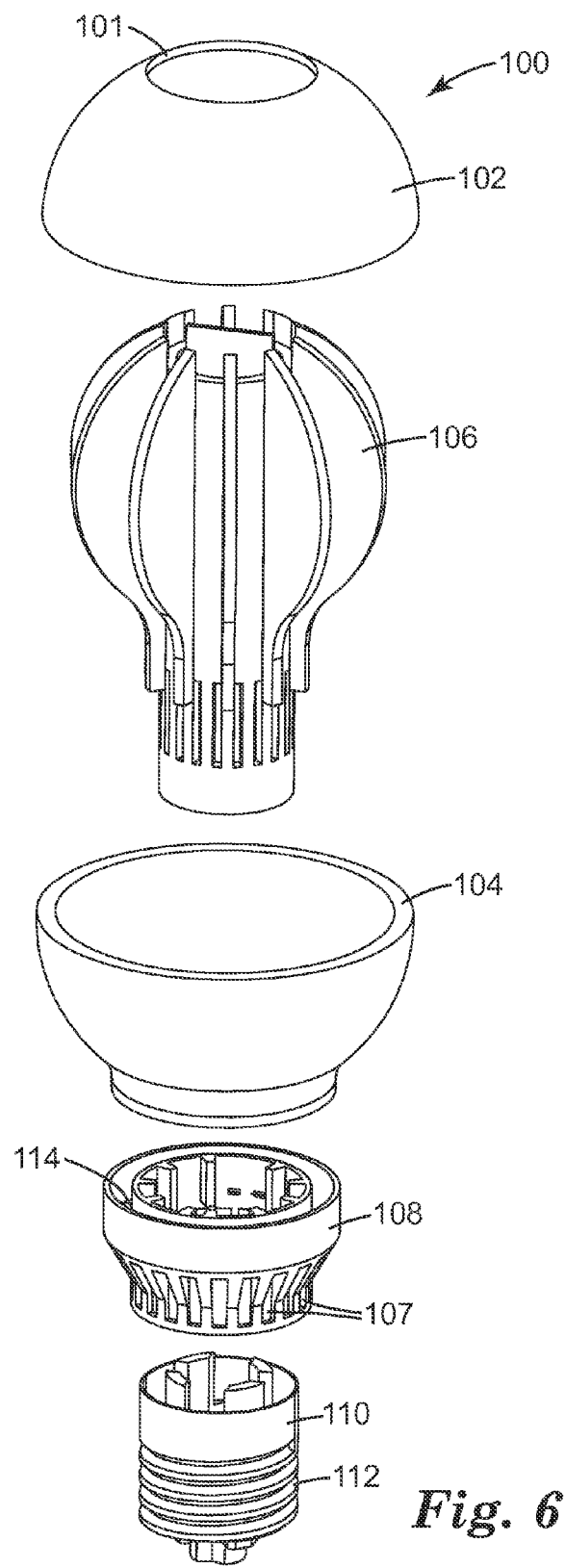
FIG. 6 is an exploded perspective view of a solid state light with a tapered optical guide.
Figure 7:
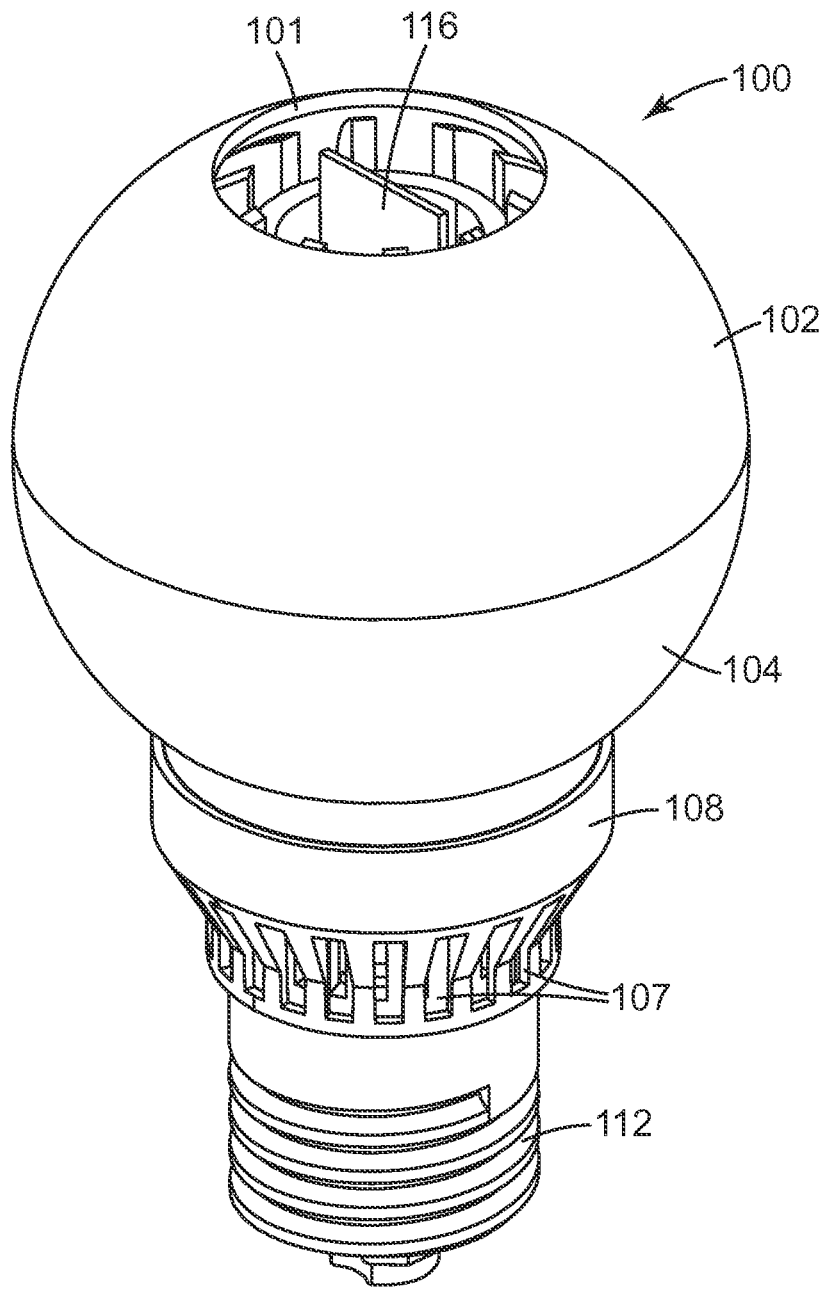
FIG. 7 is a perspective view of the light of FIG. 6 as assembled.
Figure 8:
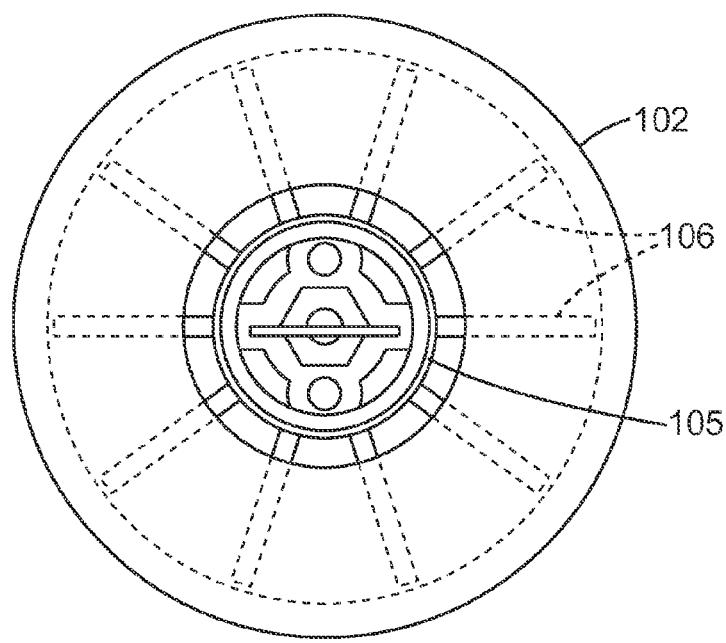
FIG. 8 is a top view of the light of FIG. 6.
Figure 9:
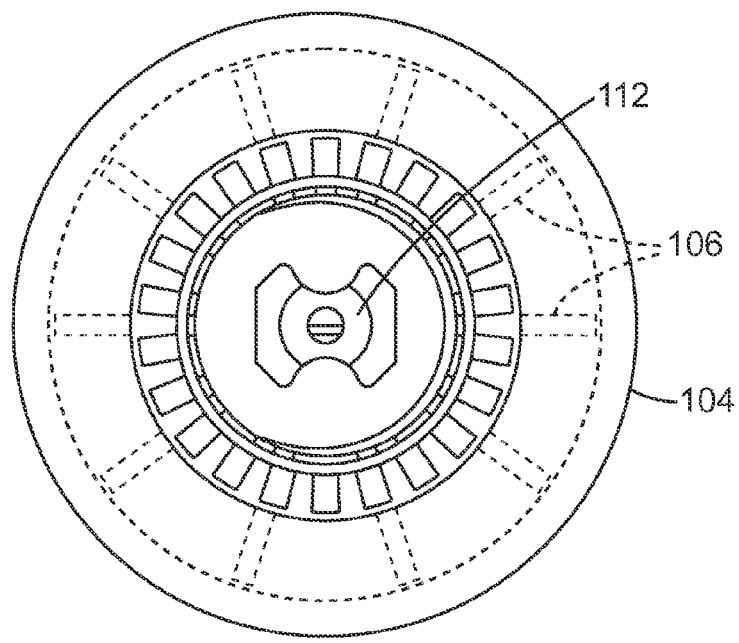
FIG. 9 is a bottom view of the light of FIG. 6.

FIG. 6 is an exploded perspective view of a solid state light 100 with a tapered optical guide. FIG. 7 is a perspective view of light 100 as assembled, and FIGS. 8 and 9 are top and bottom views, respectively, of light 100. The perspective view in FIG. 7 is looking at the side and top of light 100, which is generally symmetrical from a side view. Light 100 includes an optical guide comprised of upper and lower portions 102 and 104, an integrated thermal guide 106, a decorative light ring 108 containing a circuit 114 having solid state light sources, a base portion 110, and a base 112 for electrical connection to a power source such as via conventional light sockets as identified above or other sockets. Although the optical guide is shown as having two portions, it can alternatively have more than two portions or be composed of a single contiguous piece of material.

As illustrated in FIG. 7, upper portion 102 mates with lower portion 104 to form the optical guide, and lower portion 104 mounts to light ring 108 in order to optically couple with solid state light sources on circuit 114. The optical guide in this embodiment has a doubly curved shape. Thermal guide 106 connects with light ring 108 and base portion 110 in order to draw and dissipate heat from the solid state light sources. As shown in FIG. 6, thermal guide 106 has a central core connected with external curved fins, which can conform to the shape of the optical guide. Also, thermal guide 106 can optionally include a reflective coating on its exterior surface. Furthermore, in any of the embodiments a reflective layer can be optionally included on the inside surface of the optical guide, such as a reflective film or white paint, or a reflective layer can be positioned between the optical guide and the thermal guide. The components of light 100 can be implemented with the exemplary materials and components identified above. Light 100 can optionally include an active cooling element as illustrated in FIG. 5.

An air passage 101 in upper portion 102 along with apertures 107 in light ring 108 allow air flow across thermal guide 106, and this type of air flow is illustrated by the arrows in FIG. 2. The top edge of upper portion 102, forming air passage 101, can be lined with a reflective film 105 (shown in FIG. 8) so that light traversing the optical guide is reflected back down the guide when it reaches the top edge in order to be distributed through the exterior or interior surfaces of the optical guide. An example of a reflective film is the Enhanced Specular Reflector (ESR) film product from 3M Company, St. Paul, Minn.

Circuitry 116, such as a printed circuit board, can be mounted in the central core of thermal guide 106 such as within a slot as shown in FIG. 7. When mounted, circuitry 116 is electrically connected with solid state light sources on circuit 114 and base 112. Circuitry 116 receives power from a power supply via base 112 and provides the required voltage and current to drive the solid state light sources. Circuitry 116 can be thermally coupled to the thermal guide in order to help cool the electronic components.

Figure 10:
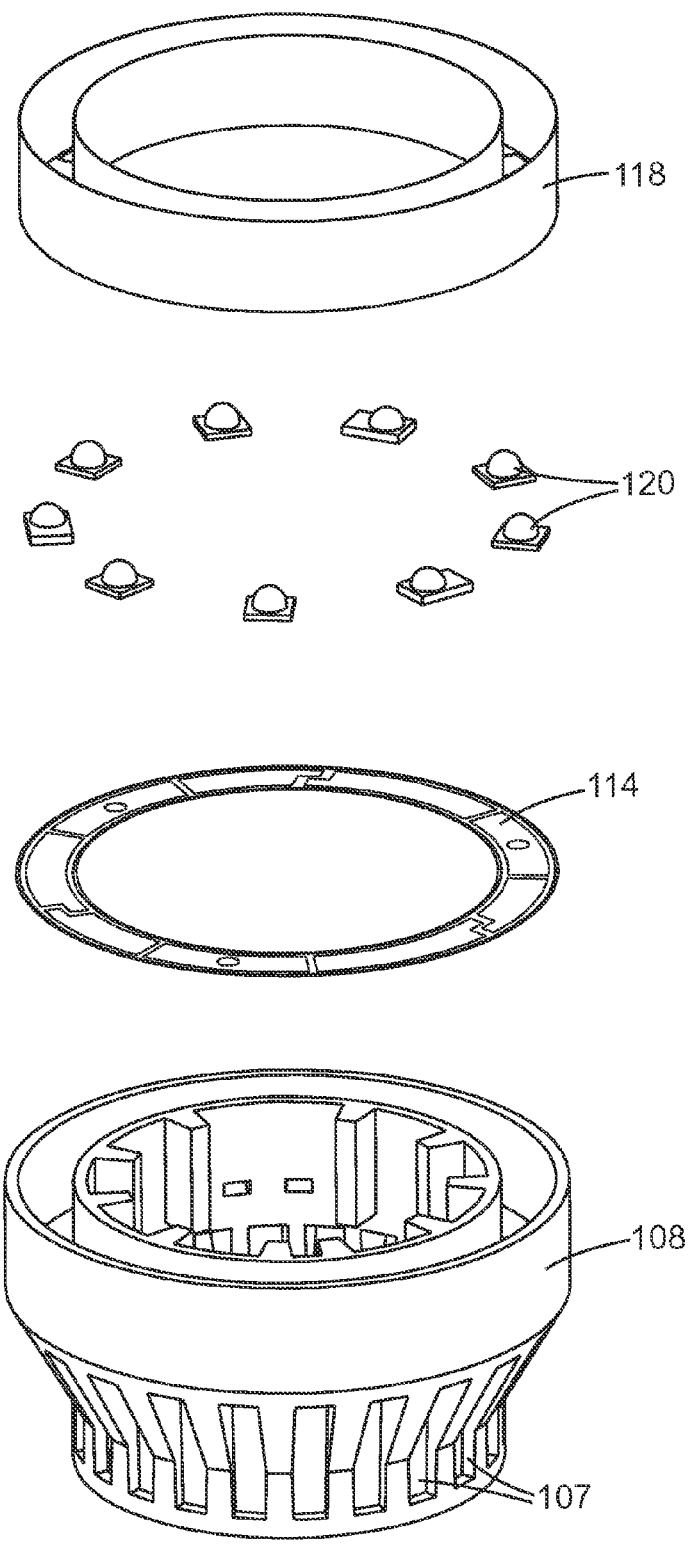
FIG. 10 is an exploded perspective view of an LED assembly for the light of FIG. 6.

FIG. 10 is an exploded perspective view of an LED assembly for light 100. Solid state light sources 120, such as LEDs, are mounted on circuit 114 and contained within light ring 108. Alternately, the LED circuit in the light ring can comprise any combination of alternating dielectric layers and conductive circuit paths that connect the LEDs and electrically isolate the LED circuit from light ring 108. Light ring 108 can be composed of a metal material such as aluminum. A pair of concentric reflective rings 118 are mounted in the circular slot of light ring 108 and over the solid state light sources 120. Reflective rings 118 help inject light from light sources 120 into lower portion 104 of the optical guide.

Figure 11:
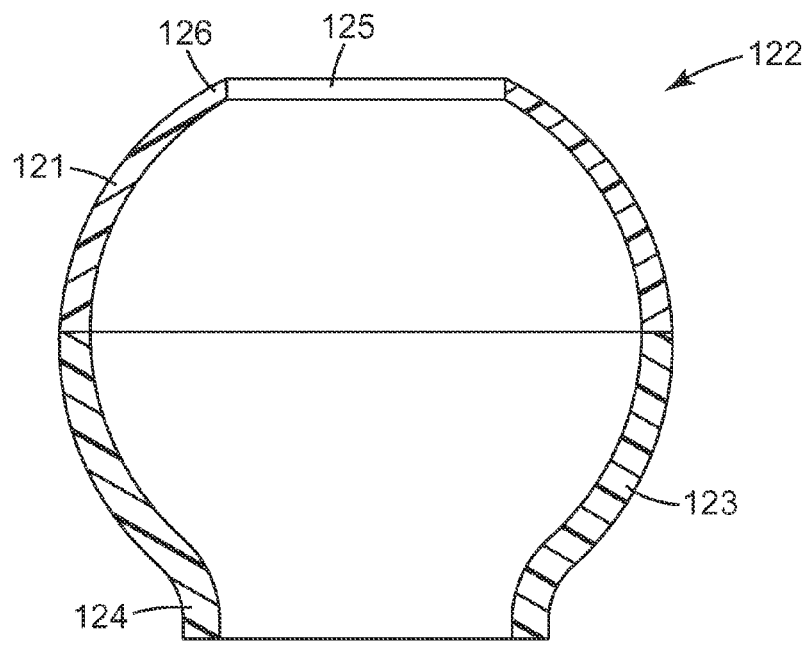
FIG. 11 is a cross sectional side view of a first tapered optical guide.

FIG. 11 is a cross sectional side view of a first tapered optical guide 122 for implementing upper portion 102 and lower portion 104 of the optical guide for light 100. Optical guide 122 includes a upper portion 121 that mates with a lower portion 123 with a horizontal seam parallel to light ring 108. Upper portion 121 includes an air passage 125 providing for air flow across the thermal guide. The thickness of lower portion 123 is substantially constant from bottom edge 124, while the thickness of upper portion 121 tapers from the thickness of lower portion 123 to a top edge 126. Upper portion 121 thus becomes thinner moving away from the solid state light sources, which enhances light extraction and distribution. This type of taper involves a discontinuous taper, meaning only a portion of the optical guide is tapered.

Figure 12:
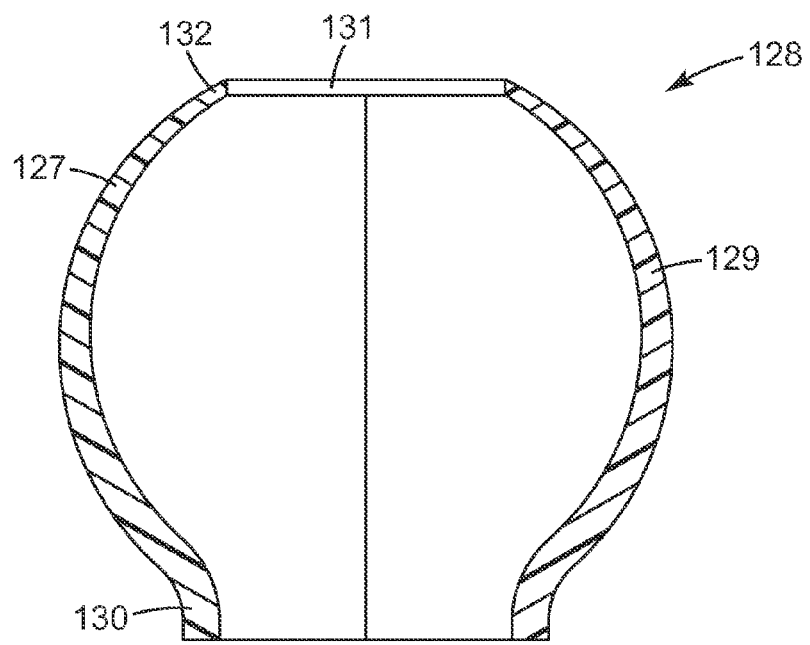
FIG. 12 is a cross sectional side view of a second tapered optical guide.

FIG. 12 is a cross sectional side view of a second tapered optical guide 128 as an alternative embodiment of the optical guide for light 100. Optical guide 128 includes a left portion 127 that mates with a right portion 129 with a vertical seam perpendicular to light ring 108. Left and right portions 127 and 129 together form an air passage 131 providing for air flow across the thermal guide. Left portion 127 tapers from a bottom edge 130 to a top edge 132, and right portion 129 tapers in a likewise manner. Therefore, this optical guide becomes thinner from the bottom edge to the top edge of each portion moving away from the solid state light sources, which enhances light extraction and distribution. This type of taper involves a continuous taper, meaning the entire optical guide is tapered. For either a discontinuous or continuous taper, the amount of taper can be varied based upon a desired distribution of light output, for example, and the amount of tapering can be determined using empirical evidence, modeling, or other techniques. Also, a discontinuous or continuous taper can be applied to the optical guide whether it includes upper and lower portions, right and left portions, or other types of portions.

Figure 13:
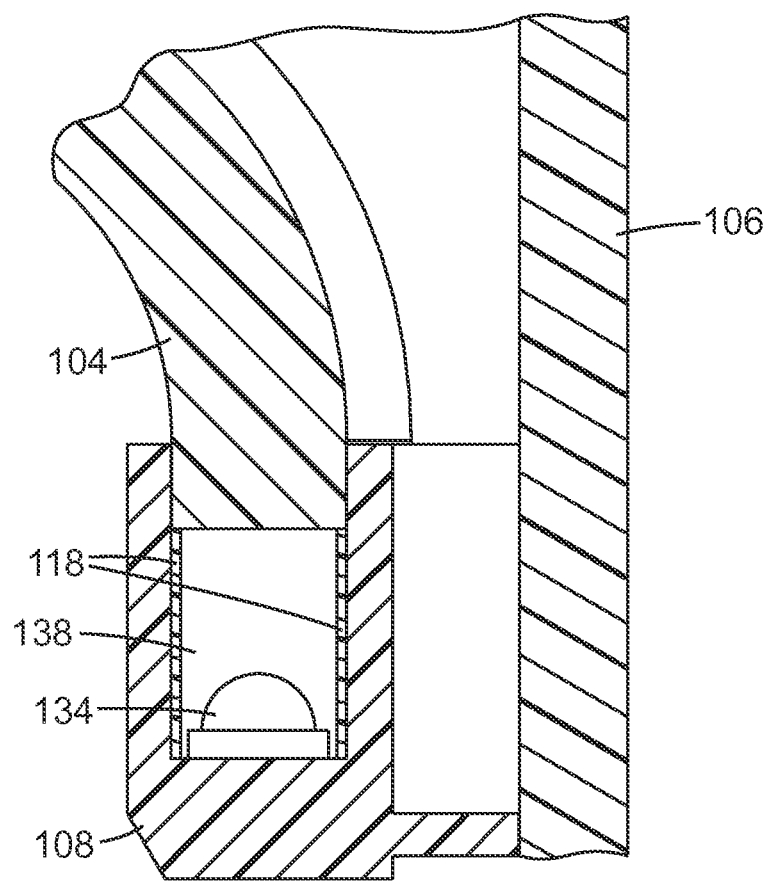
FIG. 13 is a cross sectional side view illustrating light injection for the light of FIG. 6.

FIG. 13 is a cross sectional side view illustrating light injection for light 100. Solid state light sources 120, such as an LED 134, are mounted within light ring 108 and between reflective rings 118. The bottom edge of lower portion 104 of the optical guide is mounted in light ring 108 and on reflective rings 118, forming an air gap 138 between LED 134 and the bottom edge of lower portion 104 of the optical guide. Light from LED 134 is injected into the bottom edge of lower portion 104 and distributed by the optical guide.

Thermal Guide with Exterior Shell

Figure 14:
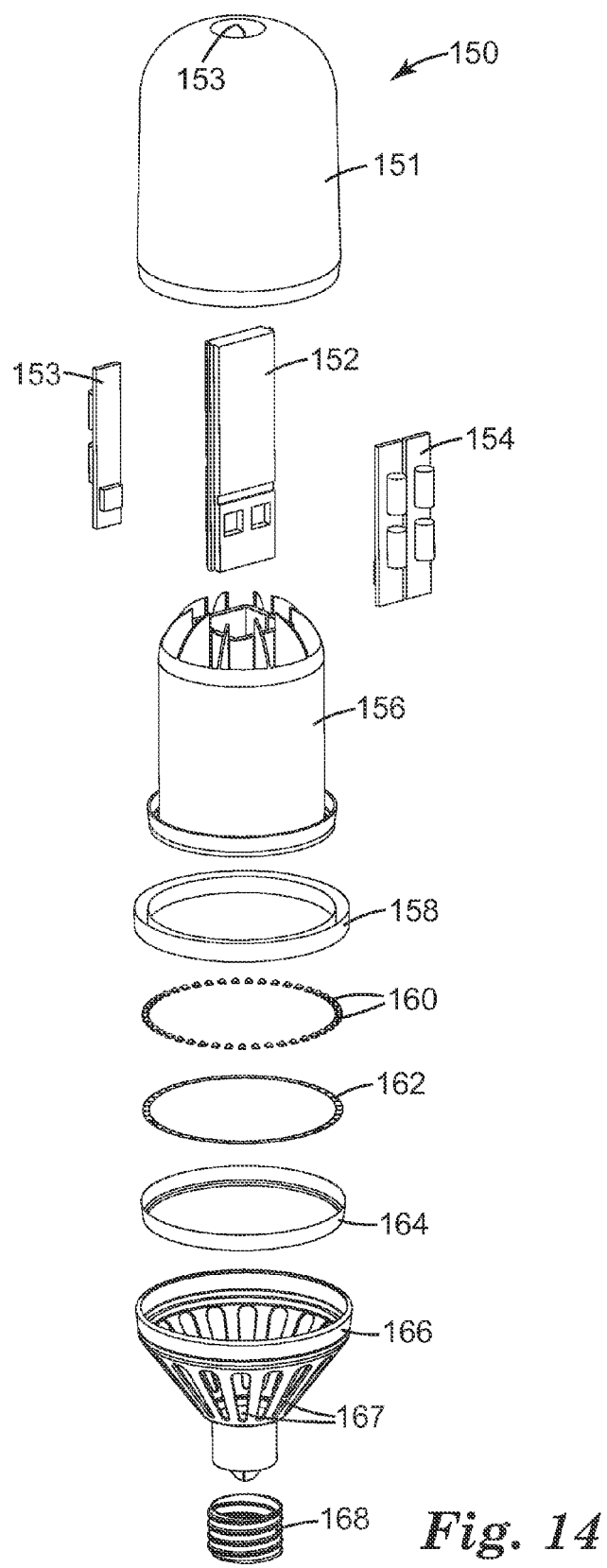
FIG. 14 is an exploded perspective view of a solid state light with a thermal guide having an exterior shell.
Figure 15:
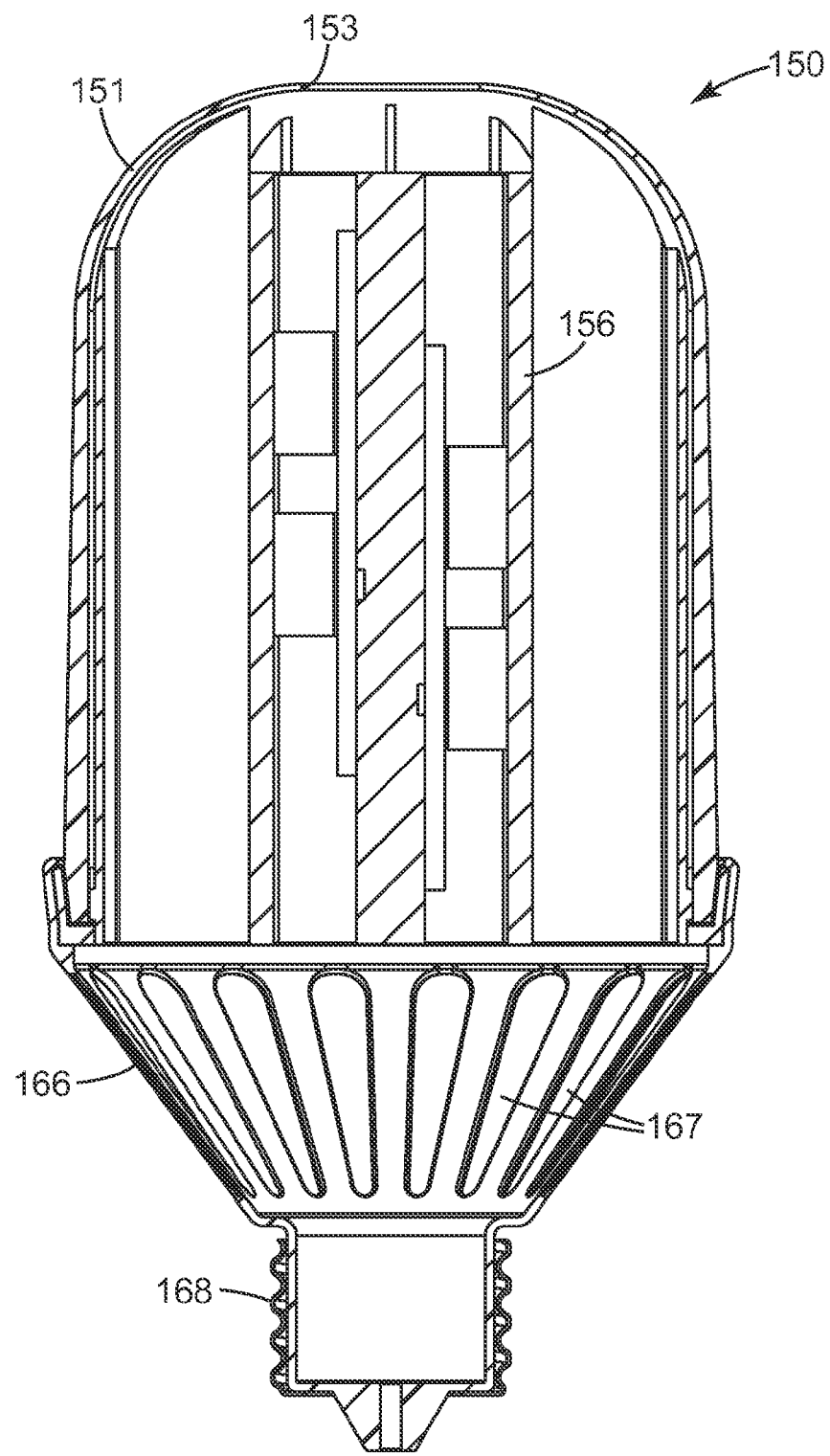
FIG. 15 is a cross sectional side view of the light of FIG. 14.
Figure 16:
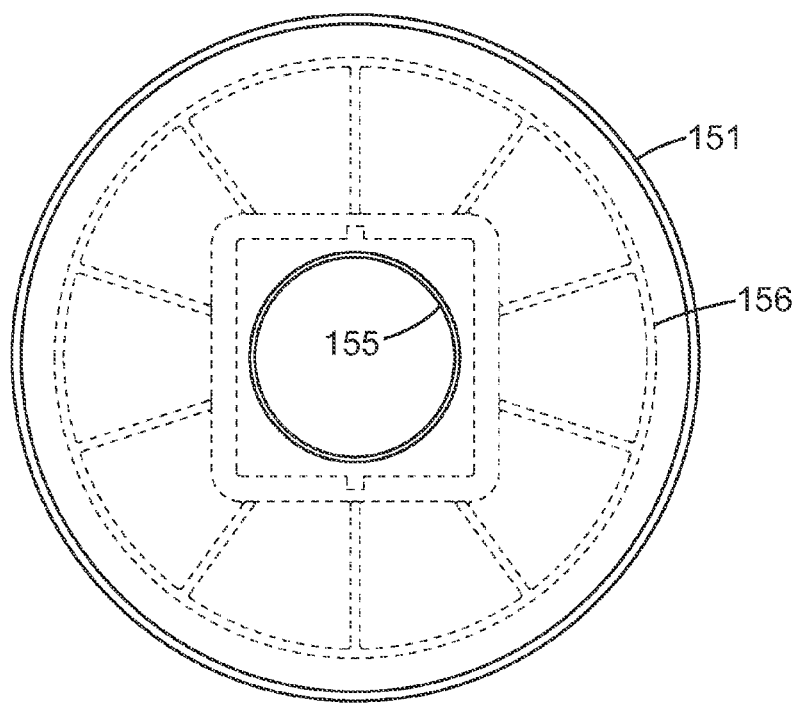
FIG. 16 is a top view of the light of FIG. 14.
Figure 17:
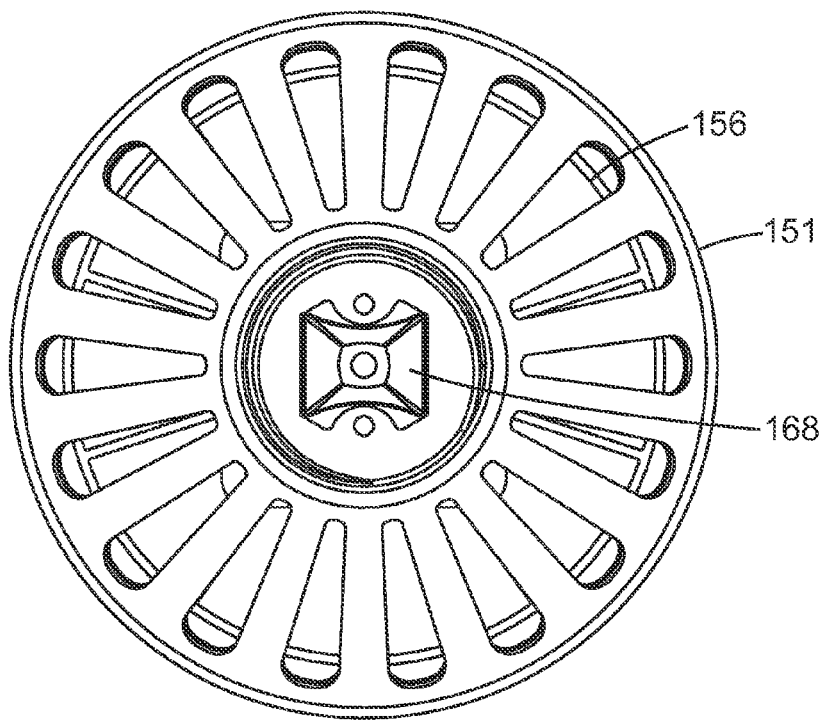
FIG. 17 is a bottom view of the light of FIG. 14.

FIG. 14 is an exploded perspective view of a solid state light 150 with a thermal guide having an exterior shell. FIG. 15 is a cross sectional side view of light 150. FIGS. 16 and 17 are top and bottom views, respectively, of light 150. Light 150 is generally symmetrical from a side view. Light 150 includes a cylindrical optical guide 151, an integrated thermal guide 156, a solid state light assembly, a decorative base ring 166, and a base 168 for electrical connection to a power source such as via conventional light sockets as identified above or other sockets. At least a portion of, or possible the entire, optical guide 151 can optionally be tapered. The components of light 150 can be implemented with the exemplary materials and components identified above. Although thermal guide 156 is shown having a cylindrical shape, other shapes are possible while still having an exterior shell. Also, thermal guide 156 can optionally include a reflective coating on its exterior surface. One type of reflective coating reflects visible light and emits infrared (IR) light. Light 150 can optionally include an active cooling element as illustrated in FIG. 5.

An air passage 153 in optical guide 151 along with apertures 167 in base ring 166 allow air flow across thermal guide 156, and this type of air flow is illustrated by the arrows in FIG. 2. The top edge of optical guide 151, forming air passage 153, can be lined with a reflective film 155 (shown in FIG. 16), such as ESR film so that light traversing the optical guide is reflected back down the guide when it reaches the top edge in order to be distributed through the exterior or interior surfaces of the optical guide.

The solid state light assembly includes a pair of concentric reflective rings 158, solid state light sources 160, a circuit 162, and a light ring 164. Solid state light sources 160, such as LEDs, are contained on circuit 162 for driving the solid state light sources. Light ring 164 includes a partial wedge shaped recess for containing circuit 162, and light ring 164 is positioned in a recess in base ring 166. Reflective rings 158 are mounted in the slot in light ring 164 and over solid state light sources 160. Reflective rings 158 help inject light from light sources 160 into a bottom edge of optical guide 151.

Circuitry 153 and 154, such as printed circuit boards, can be secured to a circuit holder 152 and mounted in the center of thermal guide 156 such as within a slot. When mounted, circuitry 153 and 154 are electrically connected with solid state light sources on circuit 162 and base 168. Circuitry 153 and 154 receive power from a power supply via base 168 and provides the required voltage and current to drive the solid state light sources. Circuitry 153 and 154 can be thermally coupled to the thermal guide in order to help cool the electronic components.

Figure 18:
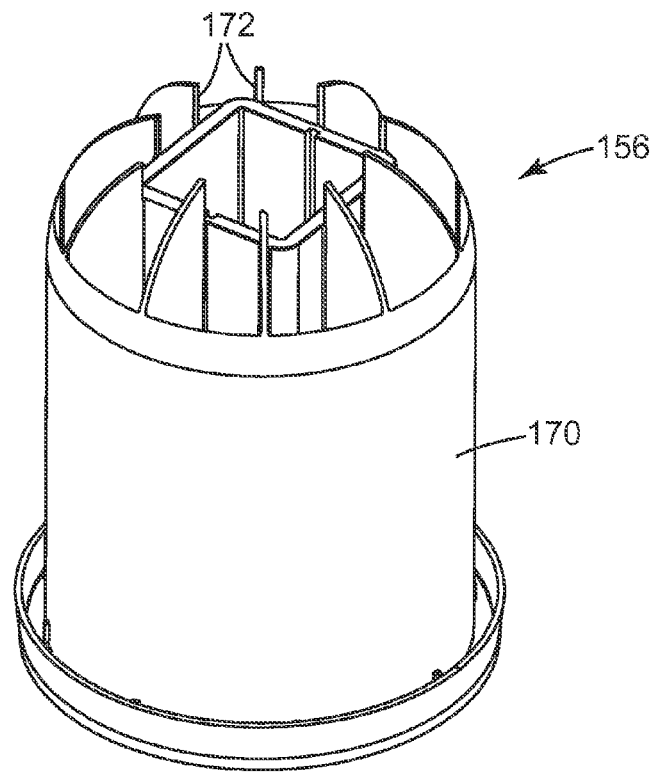
FIG. 18 is a perspective view of a first thermal guide for the light of FIG. 14.
Figure 19:
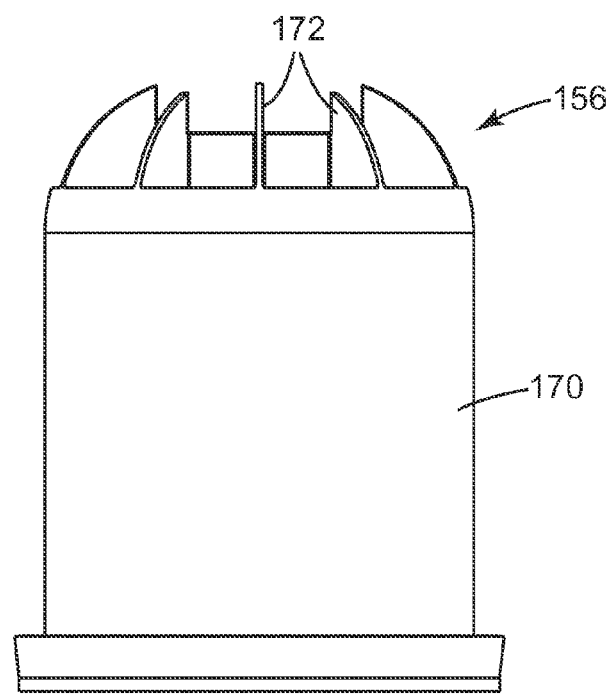
FIG. 19 is a side view of the first thermal guide.
Figure 20:
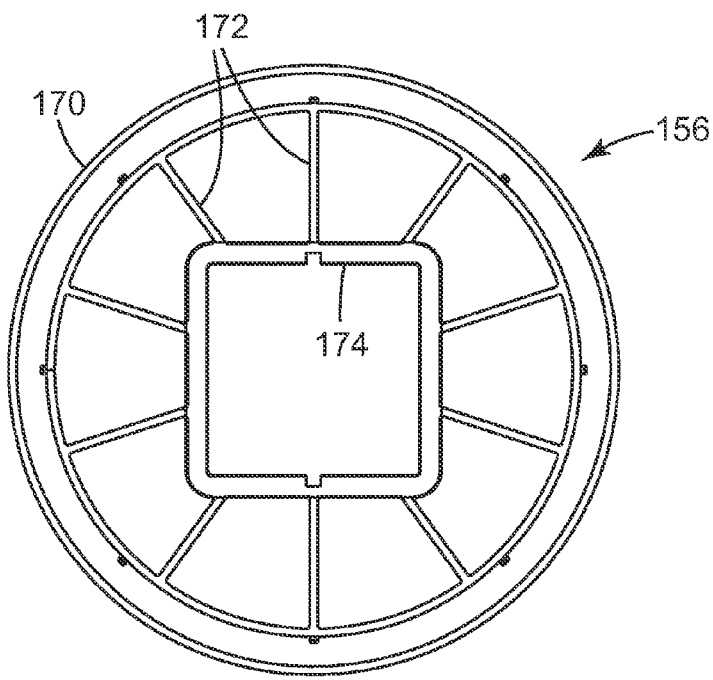
FIG. 20 is a top view of the first thermal guide.

FIG. 18 is a perspective view of thermal guide 156. FIGS. 19 and 20 are side and top views, respectively, of thermal guide 156. Thermal guide 156 includes an exterior shell 170 containing internal fins 172, curved at the top to conform to the curved top portion of optical guide 151. A core section 174 is connected to the fins and contains a slot for accommodating circuit holder 152. Use of exterior shell 170 provides for a back reflector to optical guide 151 such that light from optical guide 151 into the interior of light 150 is reflected back through optical guide 151, enhancing the light output. The exterior of shell 170 can be covered with a reflective coating or paint such as the Starbrite II water primer from Spraylat Corporation, Chicago, Ill., which provides a white surface finish. One type of reflective coating or paint reflects visible light and emits IR light.

Figure 21:
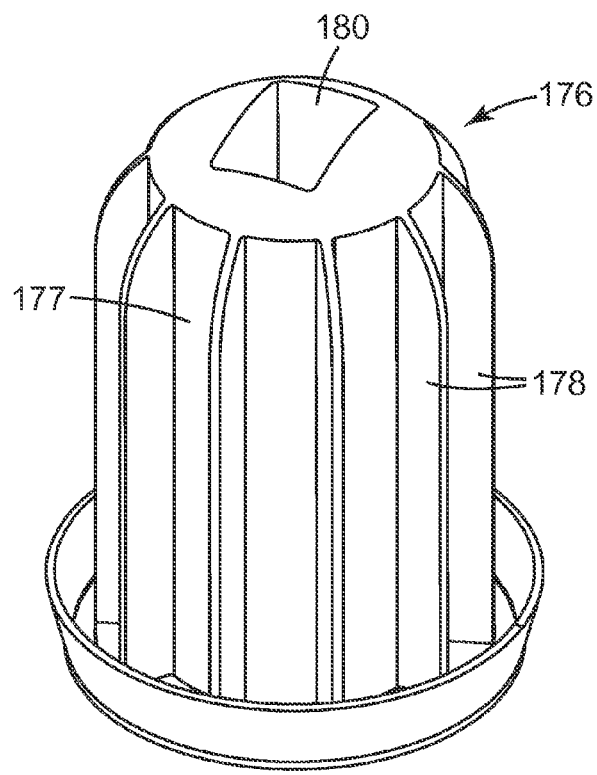
FIG. 21 is a perspective view of a second thermal guide for the light of FIG. 14.
Figure 22:
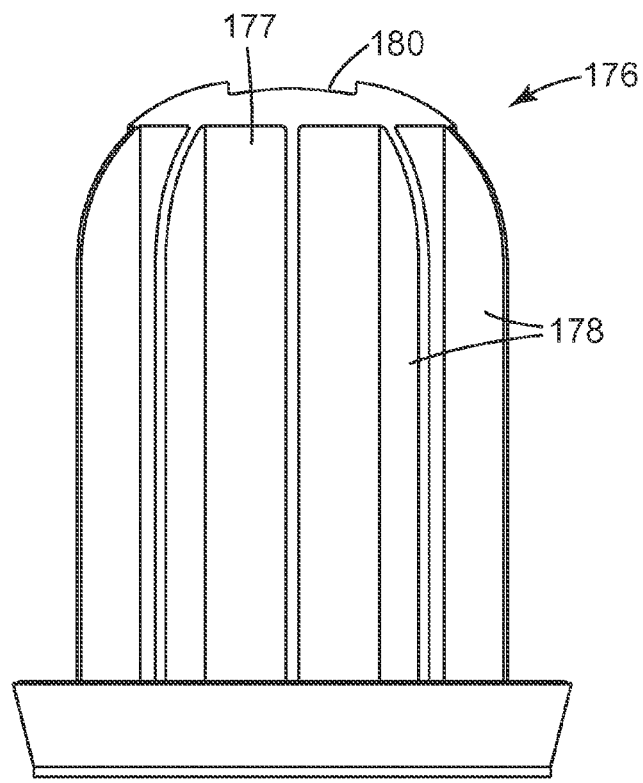
FIG. 22 is a side view of the second thermal guide.
Figure 23:
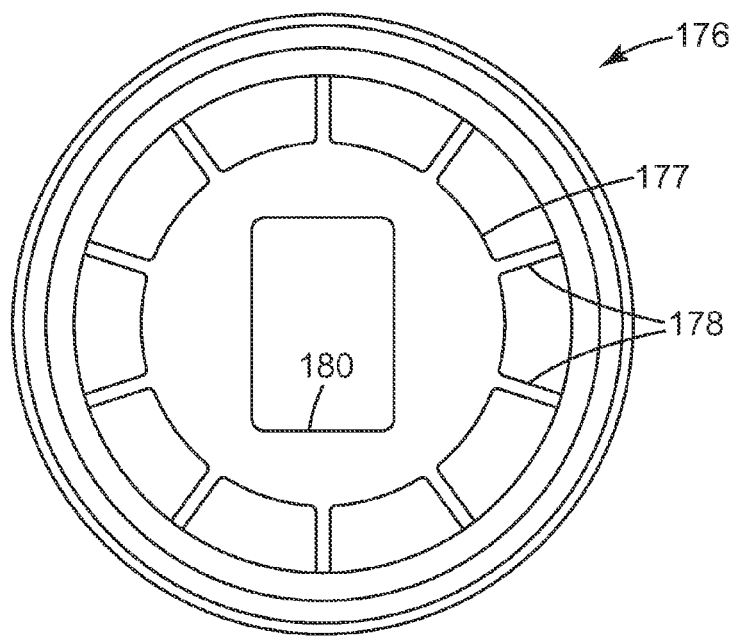
FIG. 23 is a top view of the second thermal guide.

FIG. 21 is a perspective view of a thermal guide 176 as an alternative embodiment of the thermal guide for light 151. FIGS. 22 and 23 are side and top views, respectively, of thermal guide 176. Thermal guide 176 includes an interior shell 177 containing external fins 178, curved at the top to conform to the top portion of optical guide 151. A core section 180 is part of interior shell 177 and contains a slot for accommodating circuit holder 152. Thermal guide 176 has exterior fins adjacent the inside of optical guide 151.

Figure 24:
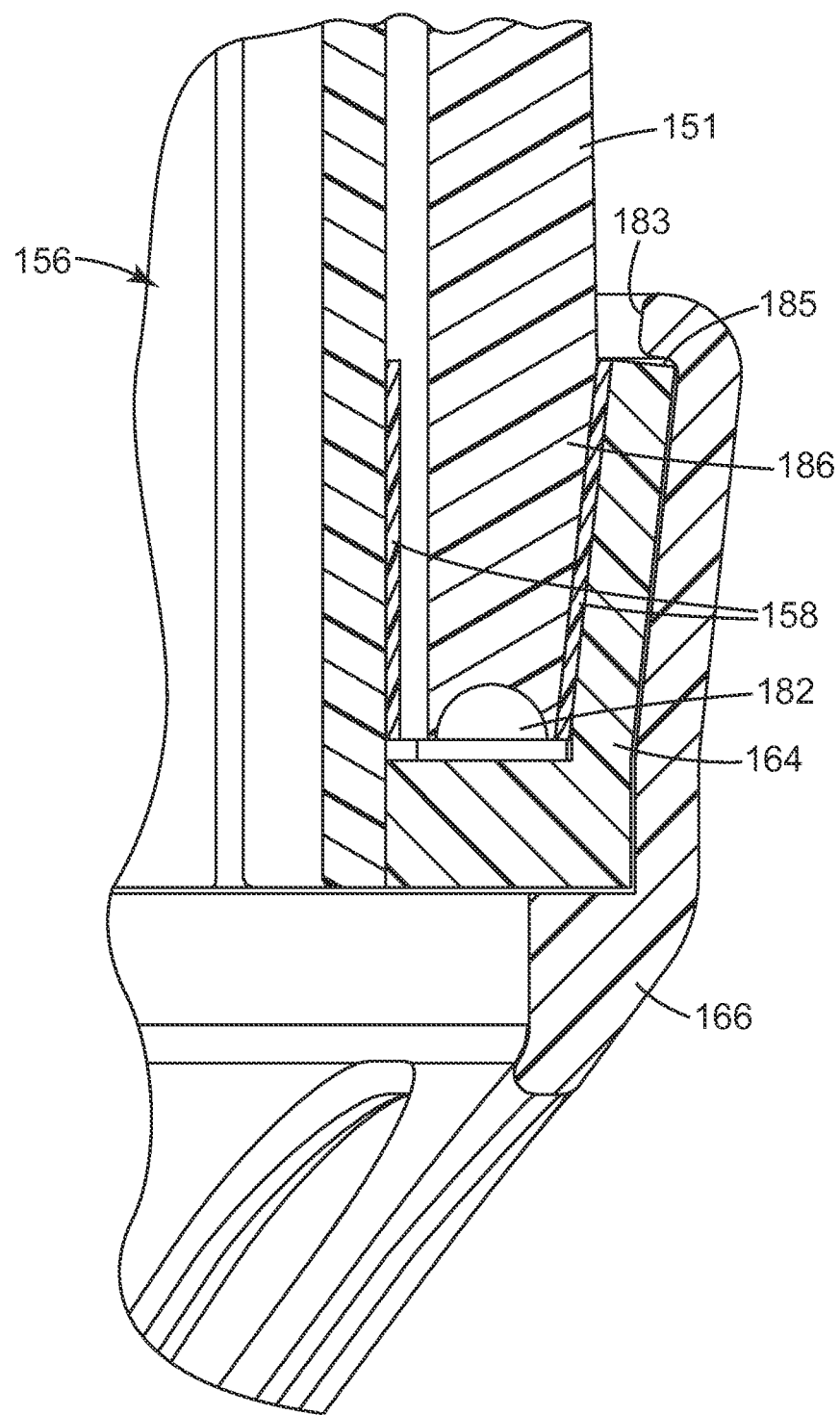
FIG. 24 is a cross sectional side view illustrating light injection for the light of FIG. 14.

FIG. 24 is a cross sectional side view illustrating light injection for light 150. Solid state light sources 160, such as an LED 182, are mounted within light ring 164 and between reflective rings 158. The bottom edge of optical guide 151 forms a wedge portion 186 mounted in light ring 164 and between reflective rings 158. The portions of light ring 164 adjacent wedge portion 186 can have a high reflectivity surface, and reflective rings 158 can be optically coupled, or not optically coupled, to wedge portion 186 of the optical guide. The bottom edge of wedge portion 186 is shaped to conform to the shape of LED 182, in this embodiment a round curved shape, although other shapes can be used depending upon the shape of the solid state light source. Light from LED 182 is injected into the bottom edge of wedge portion 186 of optical guide 151 and distributed by the optical guide. The optical guide can optionally be potted or adhered to LED 182 using silicone, acrylic, or other materials. To secure the components, thermal guide 156 and light ring 164 nest into base ring 166, and a curved portion 183 of base ring 166 "snaps" around a top edge 185 of light ring 164.

Extraction Patterns for Optical Guide

FIGS. 25 and 26 are top views illustrating examples of optional patterns of extraction features for the optical guide, portions 102 and 104, in light 100. These extraction patterns, or other such patterns, can be applied to the interior or exterior surfaces, or both, of the optical guide for efficient and substantially uniform angular distribution of light emitted by the optical guide. Alternatively, other extraction patterns may be applied to produce non-uniform but desirable distribution of light from the optical guide. FIG. 25 illustrates a substantially uniform extraction pattern with a slight variation in extraction feature density. FIG. 26 illustrates a more non-uniform pattern to compensate for the tight radius that the light has to traverse upon being emitted by the LEDs and traveling up lower portion 104 of the optical guide.

The extraction patterns can be applied to the exterior or interior surfaces, or both, of the optical guide as painted white dots using a mask with a corresponding pattern. As an alternative to a dot pattern, the exterior or interior surfaces of the optical guide can include a uniform white coating. Light 150 can also optionally include an extraction pattern applied to the exterior or interior surfaces, or both, of optical guide 151.

EXAMPLE

A light bulb was produced in accordance with FIGS. 6-11 and 13.

Light Ring Subassembly

The light ring subassembly (FIG. 10) is the light engine of the LED bulb design. It includes an LED circuit assembly typically comprising 9 Nichia NCSW119T (or equivalent) white LEDs soldered to a flexible circuit comprising 18 micron copper on 1 mil (0.001 inches) thick polyimide or other polymer substrate. This flexible circuit was laminated to an aluminum ring component (light ring 108 in FIGS. 6, 7, and 10) using 3M TC 2810 thermally conductive epoxy adhesive (3M Company) applied to produce a very thin bond line (approximately 0.001 inches or thinner) that enhances thermal conductivity between the LEDs and the aluminum ring. The aluminum ring was machined out of an aluminum block in accordance with FIG. 10. Prior to mounting the LEDs in the light ring, the exterior of the aluminum light ring was painted white by spraying a thin coating of the Starbrite II ZR-6221 product from Spraylat Corporation, Chicago, Ill., diluted with 30% water. The aluminum ring is the primary thermal path from the LEDs, through the flex circuit, to the thermal guide in the light design.

Once the LEDs were bonded into the light ring, the Vikuiti ESR film from 3M Company was laminated to the side walls of the light ring subassembly. The ESR film is disposed as shown in FIGS. 10 and 13.

An aluminum thermal guide was then machined in accordance with FIG. 6 (thermal guide 106). The thermal guide was painted white by spraying it with a thin coating of the Starbrite II ZR-6221 product diluted with 30% water. The section of the thermal guide below the fins was not painted white.

Next the light guides were fabricated by machining a block of clear cast acrylic in accordance with FIGS. 6 and 7 (optical guide formed by upper and lower portions 102 and 104). The light guides were still rough after machining The interior and exterior surfaces were polished using the 3M Headlight Restoration Kit product (3M Company). The recommended step by step procedure was followed, resulting in a clear top and bottom light guides. Next the edges of the light guide were flattened and polished by lapping the surfaces smooth and flat. Next a mask was applied to the interior of the light guides, which had a desired hole pattern. The interior surface including the adhered mask was then painted white by spraying a thin coating of the Starbrite II ZR-6221 product diluted with 30% water over the entire interior surface of the light guides. The paint was allowed to partially dry, which took about 10 minutes. The mask was then removed from the interior surface. The areas where the holes were retained the white Starbrite coating, leaving dots of white paint that acted as a light extraction pattern on the inside surface of the light guides.

Next, the bottom light guide was inserted 2-3 mm into the light ring (light ring 108 in FIGS. 6, 7, and 10). The light guide was pressed into place using the Carver Laboratory Press Model C product from Carver, Inc., Wabash, Ind. The distance the light guide was inserted into the light ring was measured using a scale as the light guide was inserted into the light ring. The light ring and light guide subassembly was then pressed onto the thermal guide using the Carver Laboratory Press Model C product. The subassembly was pressed onto the thermal guide until 9-10 mm of the bottom of the thermal guide was protruding out from the light ring subassembly.

Next, the top half of the light guide was applied to the subassembly described above. A pressure sensitive adhesive was used to form the bond between the top and bottom light guide halves (upper and lower portions 102 and 104 in FIGS. 6 and 7). The adhesive that was used to laminate the top half of the light guide to bottom half was 3M Optically Clear Adhesive 8187 (3M Company). This adhesive is supplied as a 0.007 inch thick adhesive with a release liner on both sides. An approximately 4 inch×4 inch square of 8187 adhesive was used to bond the two pieces of the light guide. The release liner was removed from one side of the adhesive and laid on a hard flat surface with the exposed adhesive facing up. The laminating edge of the light guide was cleaned with a soft cloth and isopropyl alcohol. The light guide was then pressed firmly onto the exposed adhesive. While pressing down on the light guide, the excess adhesive was trimmed from the outside edge with a scalpel. The light guide was then turned over and the excess adhesive on the interior of the light guide was trimmed away with a scalpel leaving a thin ring of adhesive laminated to the light guide covered with a release liner. The bottom half of the light guide was positioned with three firm contact points at approximately 120° apart along the perimeter of the light guide. The release liner was removed from the top light guide and slowly lowered over the bottom light guide using the three contact points to guide the alignment. After the guides were laminated, pressure was applied for one minute to ensure complete optical coupling of the guides by the adhesive.

Electronics Installation

Prior to electronics installation the primary bulb thermal guide was drilled and tapped near the base, and the Delrin insulator base was drilled for clearance so that one of the Delrin tabs that was inserted into the heat sink could be locked to the heat sink, preventing it from sliding out or twisting when the bulb was screwed into an Edison socket. The remaining 3 tabs of the Delrin mount were trimmed as needed with a heat knife to allow more room for the electronics.

The solder lugs and Edison screw base (base 112 in FIGS. 6 and 7) were attached to the Delrin insulating base prior to installation. Two wires were soldered to the base that would later be connected to the circuit board.

A secondary heat coupler was fabricated to thermally couple the hottest components (the bridge rectifier, a transistor—used in the TRIAC holding current portion of the circuit, the switching transistor, and the flyback diode) to the thermal guide, using the Thermally Conductive Adhesive Transfer Tape 8820 product (3M Company). The heat coupler was machined to match the radius of the inner diameter of the thermal guide while connecting intimately with the four circuit components. Once the coupler was attached to the circuit board, thermally conductive grease (Wakefield 120 Thermal Compound product) was applied to the coupler's exterior surface such that excellent heat transfer was established between the electronics and the primary thermal guide. Before the electronics were finally inserted, the wires from the LEDs were soldered to the circuit board's output terminals. The board was then inserted from the top and pushed through such that the board protruded from the bottom of the bulb base. The wires from the Edison base were then soldered to the board and tucked inside the base as the base was inserted into the heat sink. A screw then locked the base to the thermal guide.

The invention claimed is:

1. A light with integrated light and thermal guides, comprising:
   a light source;
   a light guide comprising a material having a first surface and a second surface opposite the first surface, wherein the second surface forms an interior volume, the light guide is in communication to the light source for receiving and distributing light from the light source through the first or second surface, and the light is transported within the light guide until the light exits from the first or second surface of the light guide, wherein the light guide has a bottom edge and a top edge, and wherein at least a portion of the light guide is tapered between the bottom edge and the top edge; and
   a thermal guide at least partially contained within the interior volume and integrated with the light guide for providing thermal conduction from the light source for cooling the light,
   wherein an air gap is formed between at least a portion of the thermal guide and the second surface of the light guide.

2. The light of claim 1, wherein the light source comprises one or more of the following: a light emitting diode; and an organic light emitting diode.

3. The light of claim 1, wherein the light guide includes light extraction features.

4. The light of claim 1, further comprising a circuit for providing power to the light source.

5. The light of claim 1, wherein the light guide has a doubly curved shape.

6. The light of claim 1, wherein the thermal guide has a central core connected with external fins.

7. The light of claim 6, wherein the fins are curved and conform to a shape of the light guide.

8. The light of claim 1, wherein the light guide has an air passage through the interior volume.

9. The light of claim 1, further comprising a light ring for containing the light source, wherein the light ring has a plurality of apertures.

10. A light with integrated optical and thermal guides, comprising:
    a light source;
    an optical guide in communication to the light source for receiving and distributing light from the light source, wherein the optical guide has a bottom edge and a top edge, and wherein at least a portion of the optical guide is tapered between the bottom edge and the top edge; and
    a thermal guide integrated with the optical guide for providing thermal conduction from the light source for cooling the light,
    wherein the optical guide comprises an upper portion and a lower portion, wherein the upper portion is separable from the lower portion, the upper portion is tapered, and the lower portion is not tapered.

11. The light of claim 1, wherein the light guide comprises an upper portion and a lower portion, wherein the upper portion is separable from the lower portion, the upper portion is tapered, and the lower portion is tapered.

12. The light of claim 1, wherein the light guide comprises a left portion and a right portion, wherein the left portion is separable from the right portion, and both the left and right portions are tapered from the bottom edge to the top edge.

13. The light of claim 1, further comprising an air gap between the light source and the bottom edge of the light guide.

14. The light of claim 1, further comprising a reflective film located on the top edge of the light guide.

15. The light of claim 1, wherein the thermal guide has a reflective surface.

16. A light with integrated optical and thermal guides, comprising:
    a light source;
    an optical guide in communication to the light source for receiving and distributing light from the light source, wherein the optical guide has a bottom edge and a top edge, and wherein at least a portion of the optical guide is tapered between the bottom edge and the top edge; and
    a thermal guide integrated with the optical guide for providing thermal conduction from the light source for cooling the light, further comprising a coating applied to an external surface of the thermal guide, wherein the coating is reflective to visible light and emissive to infrared light.

17. A light with integrated light and thermal guides, comprising:
    a light source;
    a light guide comprising a material having a first surface and a second surface opposite the first surface, wherein the second surface forms an interior volume, the light guide is coupled to the light source for receiving and distributing light from the light source through the first or second surface, and the light is transported within the light guide until the light exits from the first or second surface of the light guide; and
    a thermal guide at least partially contained within the interior volume and integrated with the light guide for providing thermal conduction from the light source for cooling the light, wherein the thermal guide has an external shell connected with internal fins,
    wherein an air gap is formed between at least a portion of the thermal guide and the second surface of the light guide.

18. The light of claim 17, wherein the light source comprises one or more of the following: a light emitting diode; and an organic light emitting diode.

19. The light of claim 17, further comprising a circuit for providing power to the light source.

20. The light of claim 17, further comprising a reflective coating on an outer surface of the external shell.

21. The light of claim 17, wherein the thermal guide has a cylindrical shape.

22. The light of claim 17, wherein the light guide has an air passage through the interior volume formed by a top edge of the light guide.

23. The light of claim 22, further comprising a reflective film located on the top edge of the light guide.

24. The light of claim 17, further comprising a light ring for containing the light source and having a partial wedge shaped recess, and wherein a bottom portion of the light guide has a shape conforming to the wedge shaped recess.

25. The light of claim 24, further comprising a base ring for containing the light ring, wherein the base ring has a plurality of apertures.

26. A light with integrated optical and thermal guides, comprising:
    a light source;
    an optical guide coupled to the light source for receiving and distributing light from the light source; and
    a thermal guide integrated with the optical guide for providing thermal conduction from the light source for cooling the light, wherein the thermal guide has an external shell connected with internal fins, further comprising a coating applied to an external surface of the shell, wherein the coating is reflective to visible light and emissive to infrared light.

27. The light of claim 17, wherein at least a portion of the light guide is tapered.

28. The light of claim 17, further comprising a reflective layer between the thermal guide and light guide.

29. The light of claim 17, wherein the light guide includes light extraction features.

30. The light of claim 1, wherein the air gap substantially surrounds the thermal guide between the thermal guide and the second surface of the light guide.

31. The light of claim 17, wherein the air gap substantially surrounds the thermal guide between the thermal guide and the second surface of the light guide.

* * * * *